US010170855B2

(12) United States Patent
Miura et al.

(10) Patent No.: US 10,170,855 B2
(45) Date of Patent: Jan. 1, 2019

(54) WATERPROOF COMPONENT HAVING A COVER WITH EXCESSIVE DISPLACEMENT PREVENTION WALL

(71) Applicant: Yazaki Corporation, Tokyo (JP)

(72) Inventors: Kazunori Miura, Shizuoka (JP); Isanori Shimizu, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/923,255

(22) Filed: Mar. 16, 2018

(65) Prior Publication Data

US 2018/0277981 A1  Sep. 27, 2018

(30) Foreign Application Priority Data

Mar. 27, 2017 (JP) .................. 2017-061088

(51) Int. Cl.
*H01R 13/627* (2006.01)
*H01R 13/52* (2006.01)

(52) U.S. Cl.
CPC ....... *H01R 13/521* (2013.01); *H01R 13/5213* (2013.01); *H01R 13/5219* (2013.01); *H01R 13/6273* (2013.01)

(58) Field of Classification Search
CPC .............. H01R 13/5202; H01R 13/521; H01R 13/5213; H01R 13/5219; H01R 13/6271; H01R 13/6273; H01R 13/6275
USPC ................. 439/271, 274, 275, 352, 353, 357
See application file for complete search history.

(56) References Cited

U.S. PATENT DOCUMENTS

| 7,465,185 B2* | 12/2008 | Tyler .................... H01R 13/506 439/352 |
| 7,465,192 B2* | 12/2008 | McKenzie ......... H01R 13/5208 439/275 |
| 7,544,081 B2* | 6/2009 | Lim .................... H01R 13/4361 439/352 |
| 2002/0086575 A1* | 7/2002 | Marpoe, Jr. ............ H01R 13/64 439/352 |

(Continued)

FOREIGN PATENT DOCUMENTS

JP  2015-146274 A  8/2015

*Primary Examiner* — Chandrika Prasad
(74) *Attorney, Agent, or Firm* — Sughrue Mion, PLLC (57) ABSTRACT

A waterproof component includes a housing body, a mat seal, and a mat seal cover. The housing body includes an attachment-hole-insertion portion having a mat-seal-accommodating chamber, an abutting portion configured to abut a first peripheral surface of the attachment hole, a locking claw provided on an insertion tip side of the attachment hole insertion portion, the locking claw to he locked to a second peripheral surface of the attachment hole, and a cover locking portion provided on an insertion tip side of the attachment-hole-insertion portion. The mat seal has an electric wire press-fitting hole. The mat-seal-accommodating chamber accommodates the mat seal. The mat seal cover locks to the cover-locking portion, the mat seal cover interposes the mat seal between the mat seal cover and a bottom wall of the mat-seal-accommodating chamber. The mat seal cover includes an excessive-displacement-prevention wall, which prevents excessive elastic deformation of the locking claw.

1 Claim, 11 Drawing Sheets (56) References Cited

U.S. PATENT DOCUMENTS

| | | | | |
|---|---|---|---|---|
| 2007/0232140 A1* | 10/2007 | Tyler | ............... | H01R 13/506 439/587 |
| 2008/0064260 A1* | 3/2008 | Mckenzie | ............ | H01R 13/5208 439/587 |
| 2009/0035981 A1* | 2/2009 | Lim | ............... | H01R 13/4361 439/352 |
| 2010/0255709 A1* | 10/2010 | Tyler | ............... | H01R 13/53 439/367 |

* cited by examiner

WATERPROOF COMPONENT HAVING A COVER WITH EXCESSIVE DISPLACEMENT PREVENTION WALL

CROSS REFERENCE TO RELATED APPLICATIONS

This application claims the priority of Japanese Patent Application No. 2017-061088, filed on Mar. 27, 2017, the entire content of which are incorporated herein by reference.

BACKGROUND

Technical Field

The present invention relates to a waterproof component for preventing water from entering various devices in which electric wires are routed over a wet area and a waterproof area.

Related Art

When electric wires are routed over a wet area and a waterproof area, such as a control device disposed in an engine room of an automobile, waterproof components attached to the electric wires prevent water from entering various devices where the electric wires are routed.

Techniques related to such a waterproof component are proposed in JP 2015-146274 A.

SUMMARY

Figure 5A:
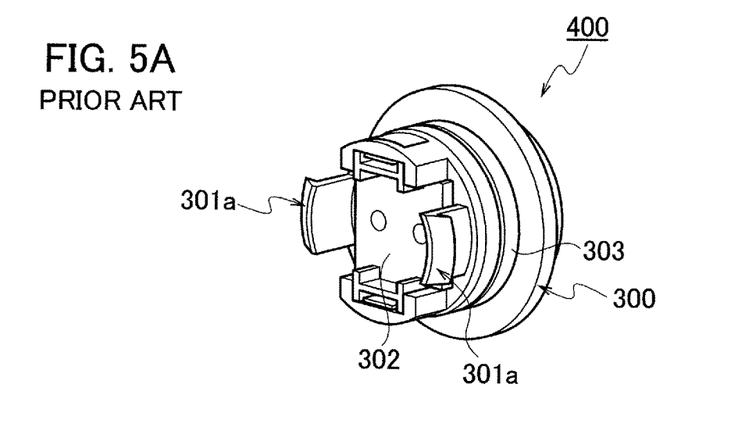
FIG. 5A is a perspective view showing the overall configuration of a waterproof component according to a reference example.
Figure 5B:
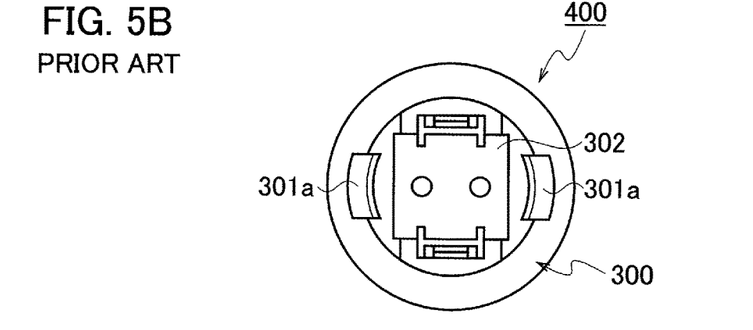
FIG. 5B is a front view showing the overall configuration of the waterproof component according to the reference example.
Figure 5C:
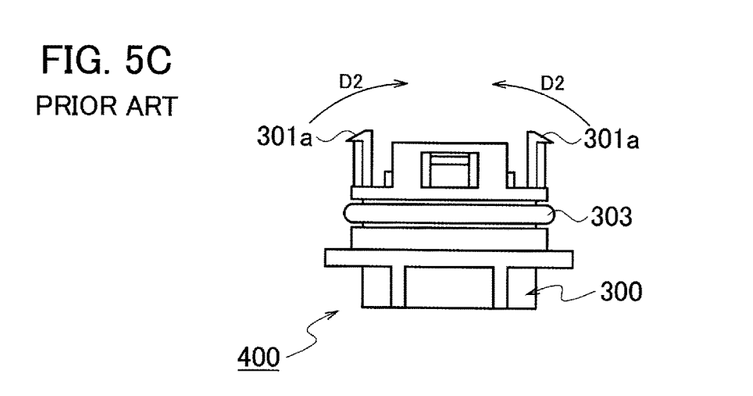
FIG. 5C is a side view showing the overall configuration of waterproof component according to the reference example.

By the way, the waterproof component 400 according to the reference example as shown in FIGS. 5A to 5C includes a housing body 300, an elastic ring (O-ring) 303, a mat seal (not shown), and a mat seal cover 302.

Then, the housing body 300 includes a locking claw 301*a* being inserted into an attachment hole of a vehicle body panel, a housing of a control device, or the like and being elastically deformable to be locked to a peripheral surface of the attachment hole.

However, in the waterproof component 400 according to the reference example, when the locking claw 301*a* is inserted in the attachment hole of the housing or the like, or when external force is applied after attachment, as shown in FIG. 5C, the locking claws 301*a* and 301*b* may be excessively deformed in the D2 direction to be damaged, and have a problem that the locking claws 301*a* and 301*b* are inferior in durability.

The present invention is made in view of the above problems, and has an object to provide a waterproof component capable of preventing excessive deformation of a locking claw and improving durability A waterproof component according to an aspect of the present invention is configured to insert an electric wire into an attachment hole penetrating a wall portion to lock. The waterproof component includes a housing body, a mat seal, and a mat seal cover. The housing body includes an attachment hole insertion portion configured to be inserted into the attachment hole, a mat seal accommodating chamber having a bottom wall being formed inside the attachment hole insertion portion, an abutting portion configured to abut a first peripheral surface of the attachment hole, a locking claw provided in an elastically deformable manner on an insertion tip side of the attachment hole insertion portion, the locking claw being configured to be locked to a second peripheral surface of the attachment hole opposite to the first peripheral surface, and a cover locking portion provided on an insertion tip side of the attachment hole insertion portion. The mat seal is accommodated in the mat seal accommodating chamber. The mat seal has an electric wire press-fitting hole through which an electric wire is to penetrate. The mat seal cover is locked to the cover locking portion. The mat seal cover interposes the mat seal between the mat seal cover and the bottom wall to hold the mat seal in the mat seal accommodating chamber. The mat seal cover is provided with an excessive displacement prevention wall on a side where the locking claw is elastically deformed when the locking claw is inserted into the attachment hole.

The waterproof component according to the aspect of the present invention provides a waterproof component capable of preventing excessive deformation of a locking claw and improving durability.

DETAILED DESCRIPTION

A waterproof component I according to an embodiment of the present invention will be described with reference to FIGS. 1 to 4.

(Configuration Example of Waterproof Component)

Figure 1:
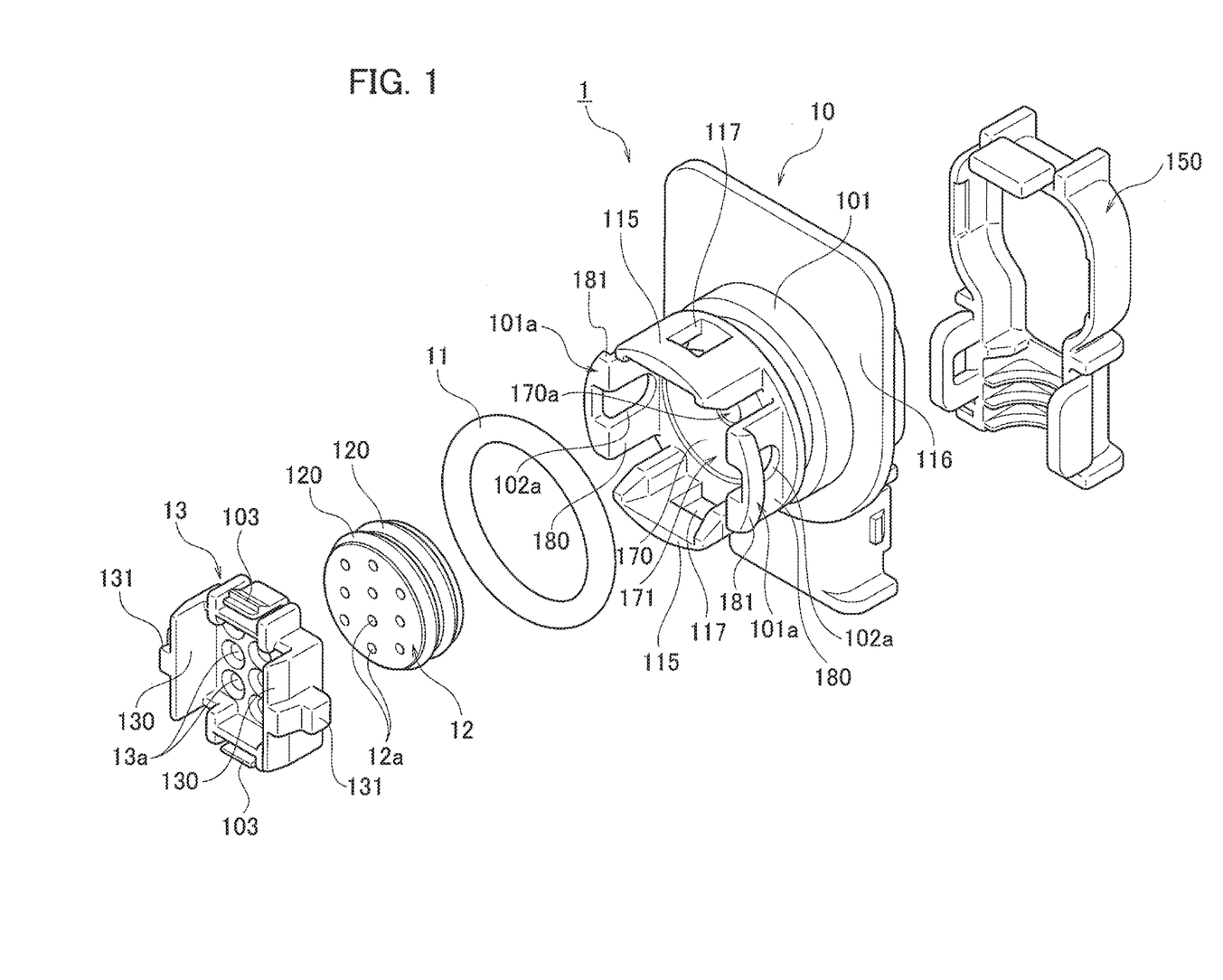
FIG. 1 is an exploded perspective view showing a configuration example of a waterproof component according to an embodiment.

The waterproof component 1 according to the embodiment of the present invention has a configuration as shown in FIG. 1 and the like.

Figure 2:
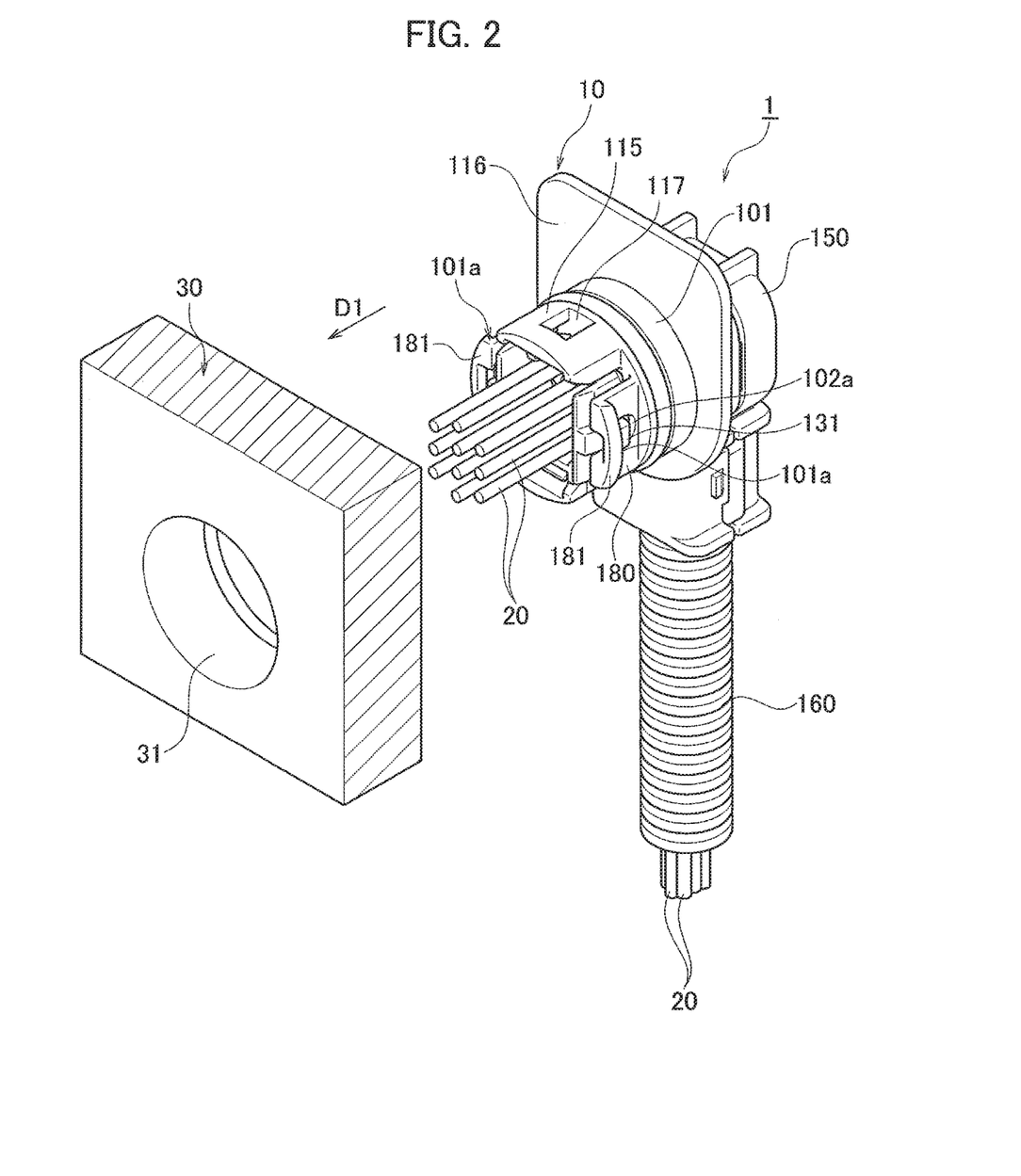
FIG. 2 is a perspective view showing a process of attaching the waterproof component according to the embodiment to the wall portion.
Figure 3A:
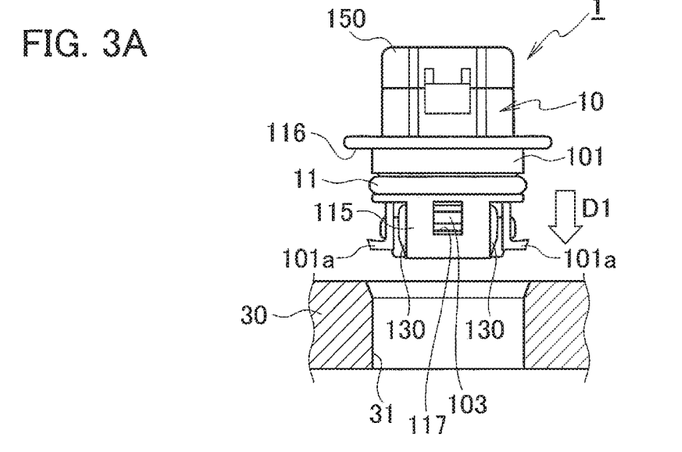
FIG. 3A is an explanatory diagram showing a state before attachment in a process of attaching the waterproof component according to the embodiment to the wall portion.
Figure 3B:
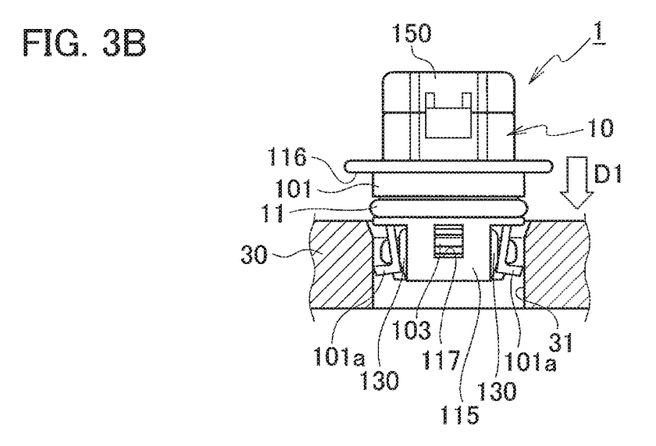
FIG. 3B is an explanatory diagram showing a process of attaching the waterproof component according to the embodiment to the wall portion.
Figure 3C:
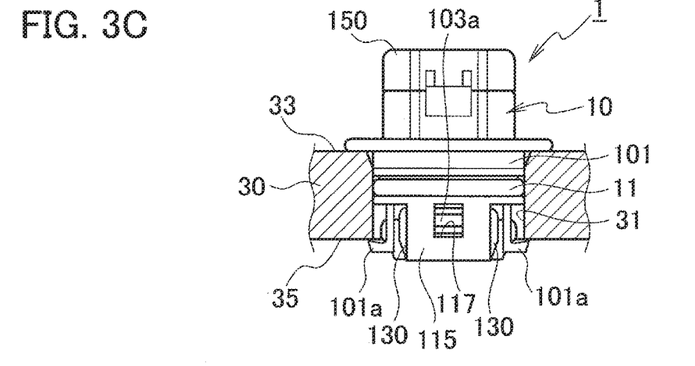
FIG. 3C is an explanatory diagram showing a state after attachment in a process of attaching the waterproof component according to the embodiment to the wall portion.
Figure 4:
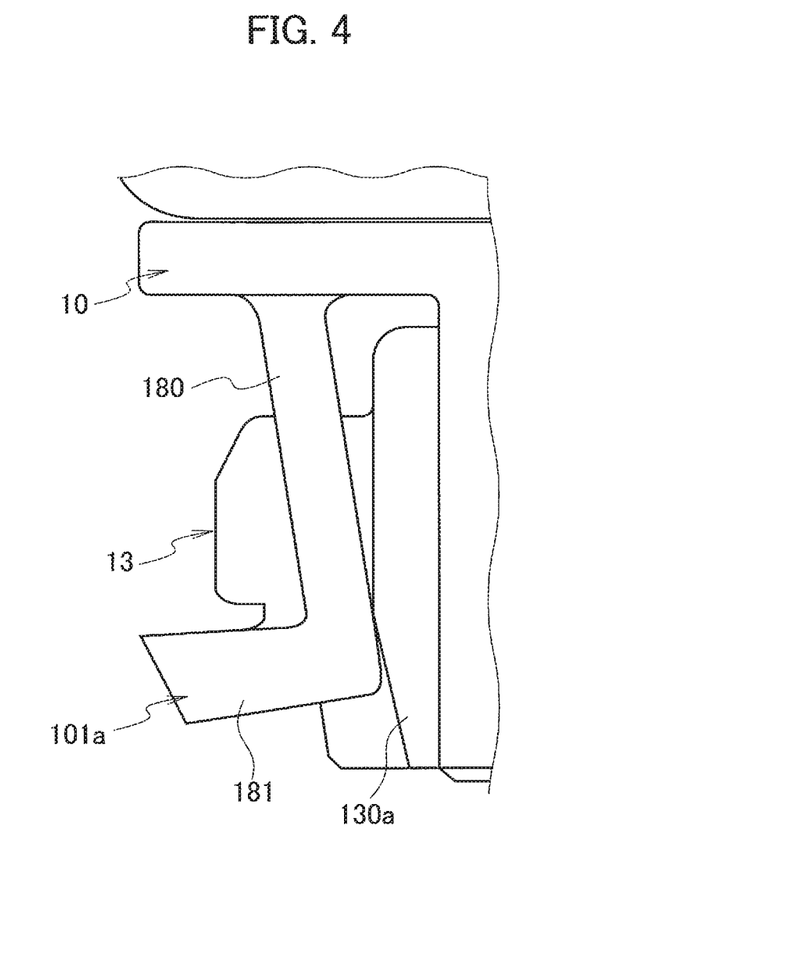
FIG. 4 is an enlarged view of a main part of the waterproof component according to the embodiment.

Here, FIG. 1 is an exploded perspective view showing a configuration example of the waterproof component 1 according to an embodiment; FIG. 2 is a perspective view showing a process of attaching the waterproof component 1 to the wall portion 30; FIGS. 3A to 3C are explanatory diagrams showing a process of attaching the waterproof component 1 to the wall portion 30; and FIG. 4 is an enlarged view of a main part of the waterproof component 1.

As shown in FIG. 2 and the like, a circular attachment hole 31 is formed in a wall portion 30 of a vehicle body panel, a control device, or the like. The attachment hole 31 is penetrated with electric wires 20. The electric wire 20 penetrates through the attachment hole 31, thereby being routed over the wet area on one side of the wall portion 30 and the waterproof area on the other side of the wall portion 30. An ECU and the like are disposed in one wet area, and various sensors and the like are disposed in the other waterproof area.

The electric wires 20 are equipped with the waterproof component 1. The attachment hole 31 of the wall portion 30 is filled with this waterproof component 1 (see FIG. 3C).

As shown in FIG. 1 and the like, the waterproof component 1 includes a housing body 10, a mat seal 12, a mat seal cover 13, and an elastic ring (O ring) 11.

The housing body 10 includes an attachment hole insertion portion 101 inserted into the attachment hole 31, an abutting portion (flange portion) 116 provided on the insertion back end side of the attachment hole insertion portion 101, a pair of left and right locking claws 101a in the figure, and a pair of upper and lower cover locking portions 115 in the figure.

The attachment hole insertion portion 101 has substantially the same outer peripheral shape as the attachment hole 31. A mat seal accommodating chamber 171 having a bottom wall 170 is formed inside the attachment hole insertion portion 101. Then, electric wire insertion holes 170a through which the electric wires 20 can be inserted are formed in the bottom wall 170.

The abutting portion 116 has a larger diameter than the attachment hole 31. The abutting portion 116 abuts on the surface 33 on one side of the wall portion 30 of the attachment hole 31 (see FIG. 3C).

The pair of locking claws 101a are disposed in positions facing each other at 180 degrees. Each locking claw 101a includes an elastic support wall 180 and a claw portion 181 provided at the tip of the elastic support wall 180. The tip of each claw portion 181 protrudes outward from the outer peripheral surface of the attachment hole insertion portion 101. Each elastic support wall 180 is formed with an engagement hole 102a to be engaged with a protrusion 131 formed on the outside of an excessive displacement prevention wall 130 on the mat seal cover 13 side to be described below.

The pair of cover locking portions 115 are disposed in positions facing each other at 180 degrees. The outer peripheral surface of each cover locking portion 115 is flush with the outer peripheral surface of the attachment hole insertion portion 101. An engagement hole 117 is formed in each cover locking portion 115. The engagement hole 117 penetrates the inner peripheral surface and the outer peripheral surface of the cover locking portion 115.

The mat seal 12 is made of an elastically deformable material and presents a disc shape. In the mat seal 12, ten electric wire press-fitting holes 12a are formed in line symmetry positions centered on the center point. The electric wire 20 penetrates through each electric wire press-fitting hole 12a (see FIG. 2 and the like). The gap between the outer peripheral surface of each electric wire 20 and the electric wire press-fitting hole 12a of the mat seal 12 is waterproofed by compressive deformation of the mat seal 12.

Two lines of protrusions 120 are provided on the outer peripheral surface of the mat seal 12. The mat seal 12 is press-fitted into the mat seal accommodating chamber 171 with the two lines of protrusions 120 compressed and deformed.

As shown in FIG. 1 and the like, the mat seal cover 13 is made of an elastically deformable material. Then, the mat seal cover 13 is provided with a pair of upper and lower locking protrusions 103 in the figure. Each locking protrusion 103 is formed to be elastically deformable in the vertical direction.

The mat seal cover 13 is formed with insertion holes 13a through which the electric wires 20 are inserted. Each insertion hole 13a is formed in a position facing each electric wire press-fitting hole 12a of the mat seal 12. In each insertion hole 13a, an electric wire 20 penetrating the electric wire press-fitting hole 12a of the mat seal 12 is inserted.

In addition, at the left and right ends of the mat seal cover 13, excessive displacement prevention walls 130 are raised on the side where the locking claw 101a of the housing body 10 is elastically deformed when the locking claw 101a is inserted into the attachment hole 31.

On the outer side of each excessive displacement prevention wall 130, a protrusion 131 for engaging with an engagement hole 102a formed in the elastic support wall 180 of the locking claw 101a is formed.

With this configuration, excessive deformation of the locking claw 101a can be prevented, and the durability of the waterproof component 1 can be improved. Specifically, how the locking claw 101a is prevented from excessive deformation will be described in an attachment process to be described below.

Each locking protrusion 103 is fitted into the engagement hole 117 of the housing body 10 from the inside to be locked. Thus, the mat seal 12 is interposed between the mat seal cover 13 and the bottom wall 170 to be held in the mat seal accommodating chamber 171.

It should be noted that the rubber-made elastic ring (O ring) 11 is disposed on the outer periphery of the attachment hole insertion portion 101 of the housing body 10 to be brought into close contact with the inner peripheral surface of the attachment hole 31.

In addition, the number of the electric wires 20 is optional, and the number of the insertion holes of the mat seal 12 and the mat seal cover 13 is naturally changed in accordance with the number of the electric wires 20.

(Attachment Process)

Next, the attachment process of the waterproof component 1 will be described with reference to FIGS. 2 to 4.

First, as shown in FIGS. 2 and 3A, the attachment hole insertion portion 101 side of the waterproof component 1 is made to face the attachment hole 31 formed in the wail portion 30 of the vehicle body panel or the like.

Then, with the tip of the electric wire 20 inserted in the attachment hole 31, the waterproof component 1 is pressed toward the D1 side.

Thus, the tip of the claw portion 181 of each locking claw 101a slidably comes into contact with the inner wall of the attachment hole 31, and the elastic support wall 180 elastically deforms inward. Then, the locking claw 101a is inserted along the inner wall of the attachment hole 31 with the elastic support wall 180 elastically deformed inward (see FIGS. 3B and 4).

At this time, as shown in FIGS. 3B and 4, the inner end of the elastic support wall 180 of the elastically deformed locking claw 101a abuts on the excessive displacement prevention wall 130 of the mat seal cover 13. Thus, excessive deformation of the locking claw 101a toward the inside can be prevented, and damage to the locking claw 101a can be prevented. That is, the durability of the waterproof component 1 can be improved.

Then, as shown in FIG. 3C, when the claw portion 181 of the locking claw 101a reaches the back surface of the wall portion 30 to be exposed, the elastic support wall 180 returns to the original position by elasticity; and the claw portion 181 is locked to the peripheral surface 35 of the attachment hole 31.

Thus, the waterproof component 1 is fixed to the wall portion 30 of the vehicle body panel or the like.

Even when an external force is applied to the waterproof component 1 in this state after attachment, due to the action of the excessive displacement prevention wall 130 of the mat seal cover 13, excessive deformation to the inside of the locking claw 101a can be prevented, and damage to the locking claw 101a can be prevented. That is, the durability of the waterproof component 1 can be further improved.

It should be noted that in the attached state as shown in FIG. 3C, in the waterproof component 1, the waterproof effect relating to the electric wire 20 is fulfilled by the close contact between the outer peripheral surface of the electric wire 20 and the electric wire press-fitting hole 12a of the mat seal 12. Then, the waterproof effect between the waterproof component 1 and the wall portion 30 is fulfilled by the close contact between the elastic ring (O ring) 11 and the inner peripheral surface of the wall portion 30.

(Other Configuration Example)

With reference to FIGS. 6 to 13B, a waterproof component 600 according another configuration example and a waterproof component 500 according to a comparative example will be described.

Figure 6:
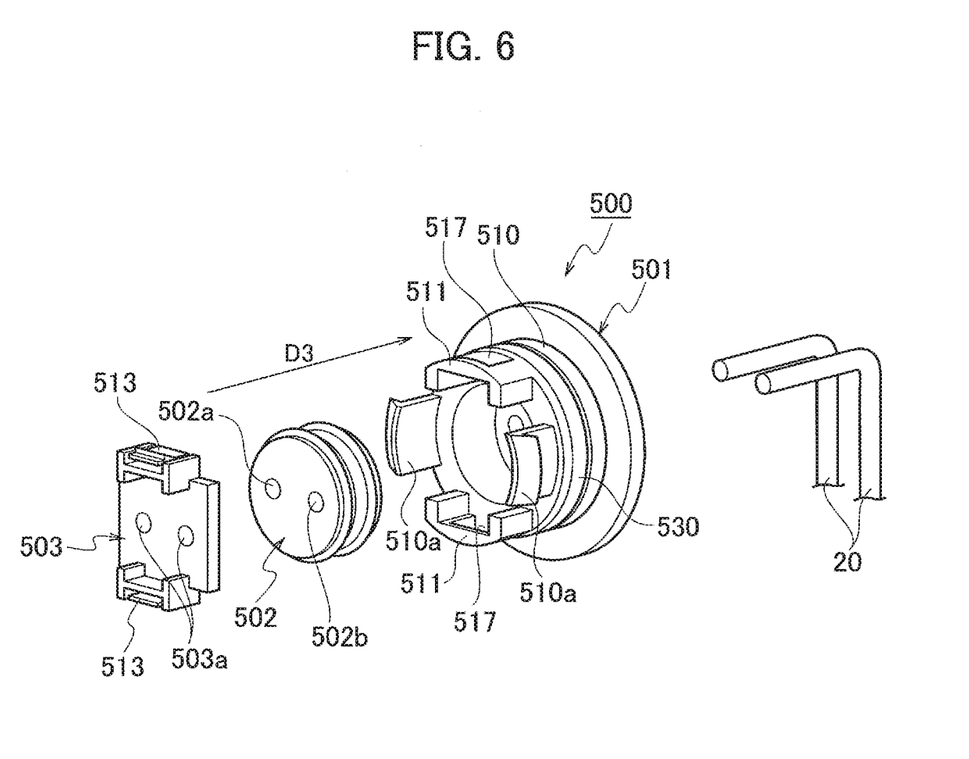
FIG. 6 is an exploded perspective view showing a configuration of a waterproof component according to a comparative example.
Figure 7A:
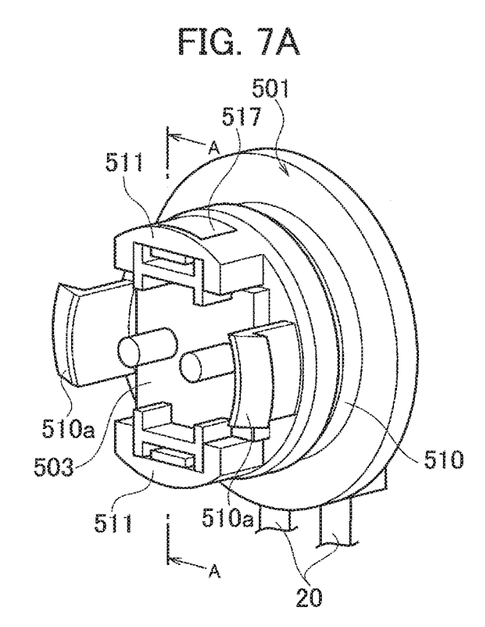
FIG. 7A is a perspective view showing a configuration of the waterproof component according to the comparative example.
Figure 7B:
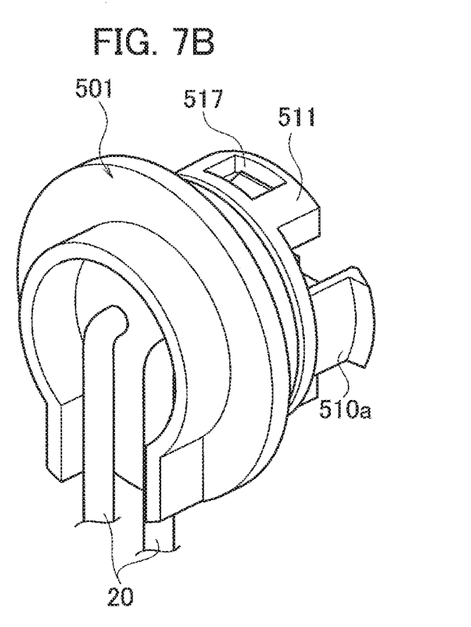
FIG. 7B is a perspective view showing a configuration of the waterproof component according to the comparative example.
Figure 8:
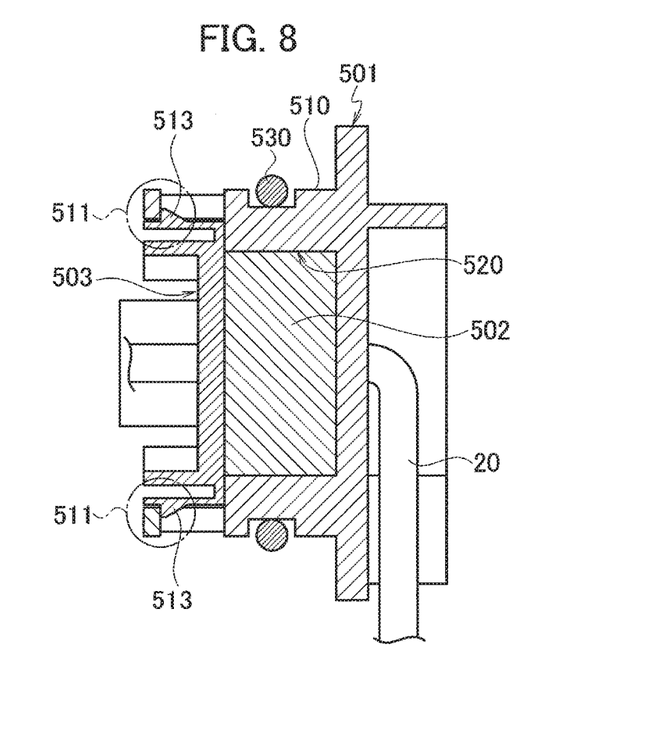
FIG. 8 is a cross-sectional view of the waterproof component according to the comparative example.

Here; FIG. 6 is an exploded perspective view showing a configuration of a waterproof component 500 according to a comparative example, FIGS. 7A and 7B are perspective views showing the configuration of the waterproof component 500 according to the comparative example, and FIG. 8 is a cross-sectional view of the waterproof component 500 according to the comparative example.

The waterproof component 500 according to the comparative example includes a housing body 501, a mat seal 502, and a mat seal cover 503.

The housing body 501 to be integrally molded with resin includes a locking claw 510a to be locked to the peripheral surface of the attachment hole and a cover locking portion 511 provided on the insertion tip side of the attachment hole insertion portion 510.

The mat seal 502 is formed of a resilient resin into a disc shape. The mat seal 502 is pressed in the D3 direction to be housed in the mat seal accommodating chamber 520 of the housing body 501 (see FIG. 8). In addition, the mat seal 502 includes a plurality of (two in FIG. 6) electric wire press-fitting holes 502a and 502b through which the electric wires 20 penetrate.

The mat seal cover 503 integrally molded with resin includes a pair of locking portions 513. The mat seal cover 503 has insertion holes 503a for the electric wires 20.

Each locking portion 513 of the mat seal cover 503 is locked to the locking hole 517 of the cover locking portion 511 of the housing body 501. Thus, the mat seal 502 is interposed between the mat seal cover 503 and the bottom wall of the mat seal accommodating chamber 520, and is held inside the mat seal accommodating chamber 520 (see FIG. 8).

It should be noted that the reference numeral 520 denotes a rubber-made elastic ring (O ring).

However, in the waterproof component 500 according to the comparative example, the positions of the electric wire press-fitting holes 502a and 502b of the mat seal 502 are not fixed. Therefore, as shown in FIG. 6, when the electric wire 20 is inserted, it is necessary to manually adjust the position of the mat seal 502, which has a disadvantage that the efficiency of the assembling work is reduced.

In addition, when the number of the electric wires 20 to be inserted increases, the number of the electric wire press-fitting holes of the mat seal 502 and the number of the insertion holes of the mat seal cover 503 also increase accordingly. In that case, depending on the insertion position of the electric wire 20, the mat seal 502 may be biased in the mat seal accommodating chamber 520 due to the weight or the like of the electric wire 20, and the sealing property (water proofing property) may be lowered.

Next, a waterproof component 600 according to another configuration example that solves the above problem will be described with reference to FIGS. 9 to 13B.

Figure 9:
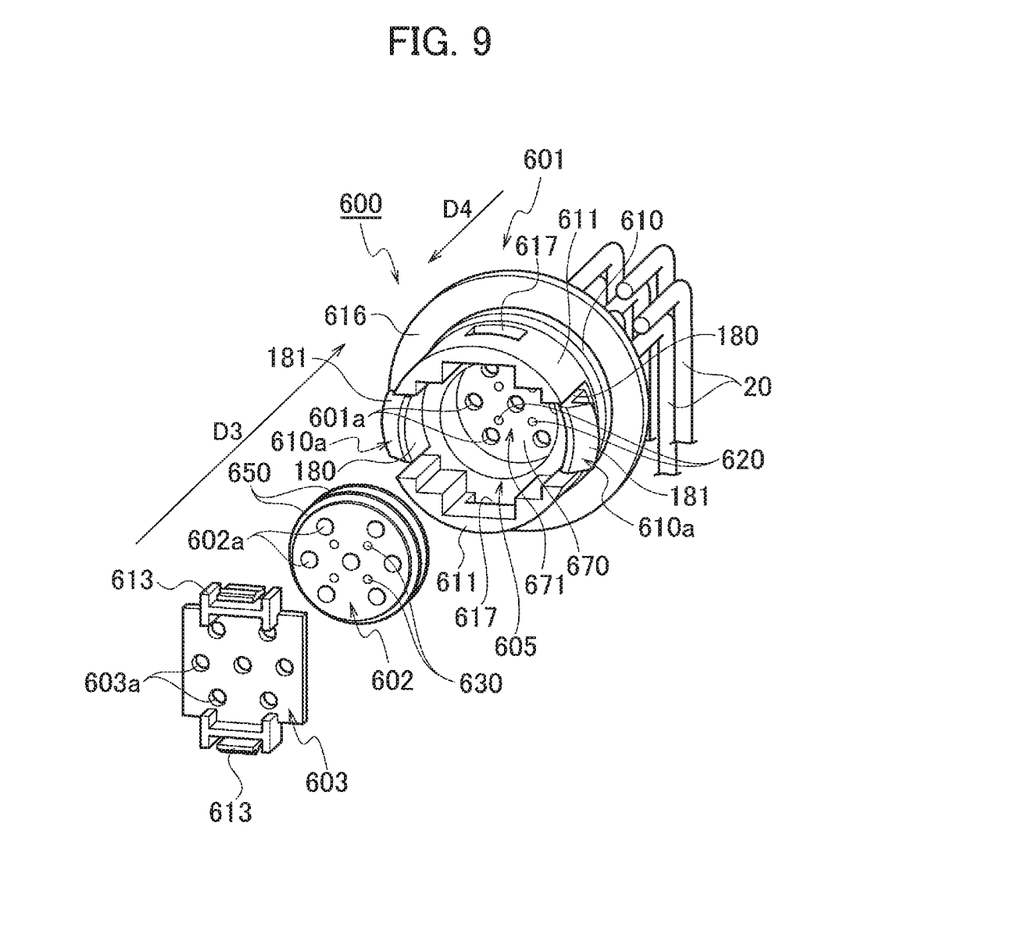
FIG. 9 is an exploded perspective view showing a waterproof component according to another configuration example.
Figure 10:
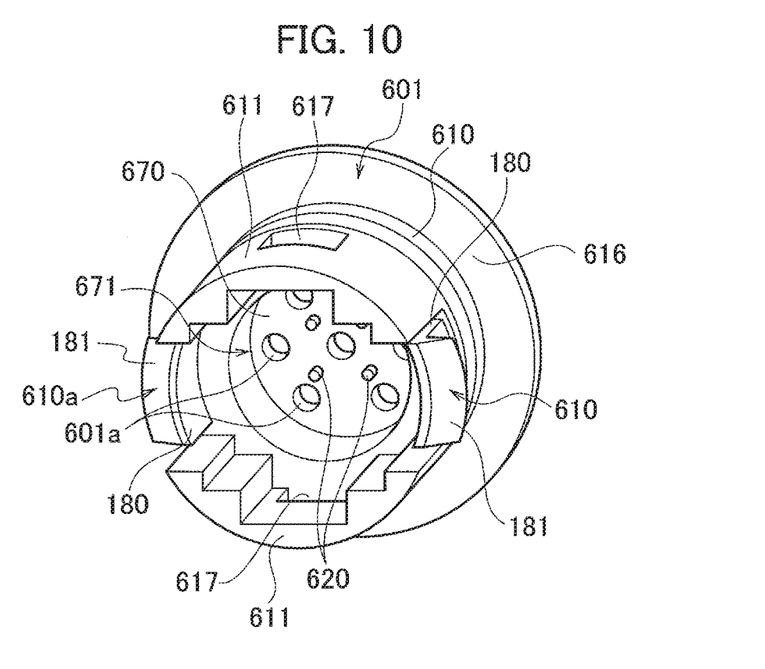
FIG. 10 is a perspective view showing a housing body of the waterproof component according to the other configuration example.
Figure 11:
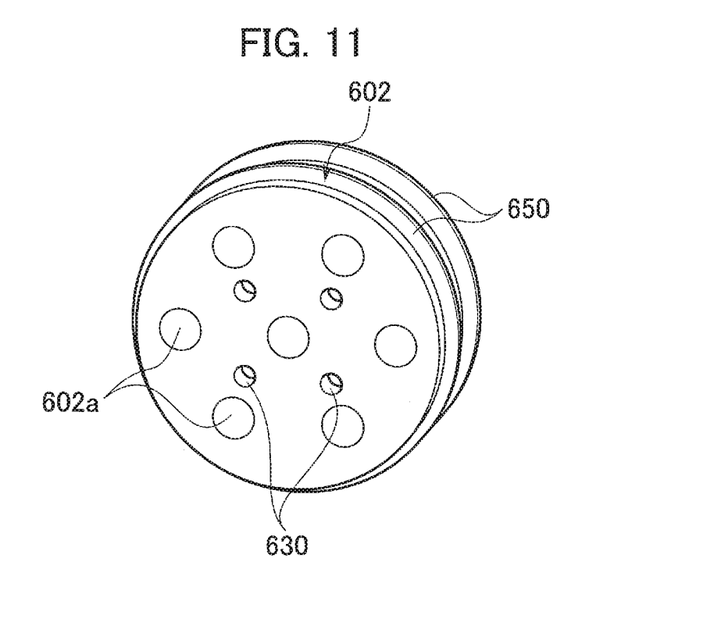
FIG. 11 is a perspective view showing a mat seal of e waterproof component according to the other configuration example.
Figure 12A:
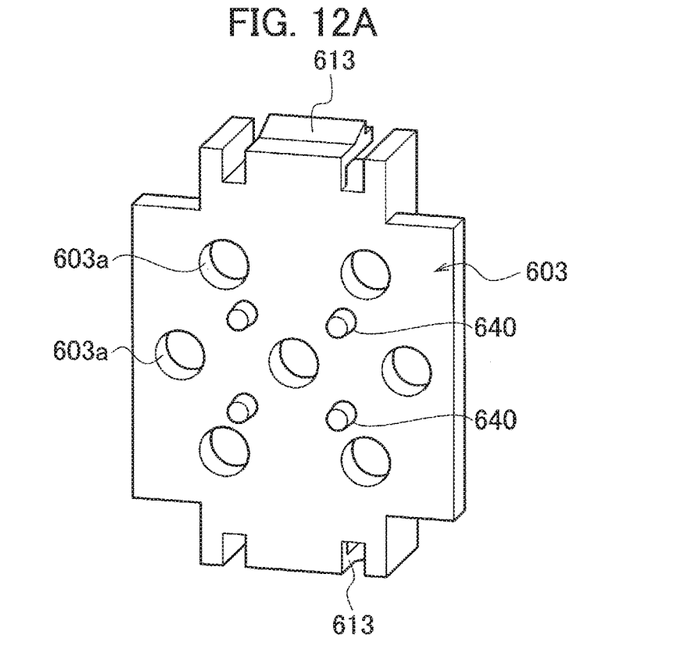
FIG. 12A is a perspective view showing a mat seal cover of the waterproof component according to the other configuration example.
Figure 12B:
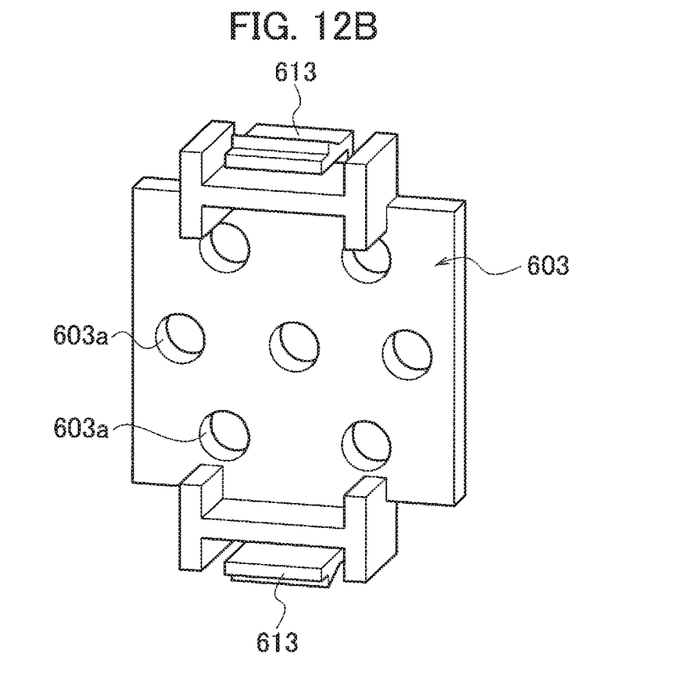
FIG. 12B is a perspective view showing a mat seal cover of the waterproof component according to the other configuration example.
Figure 13A:
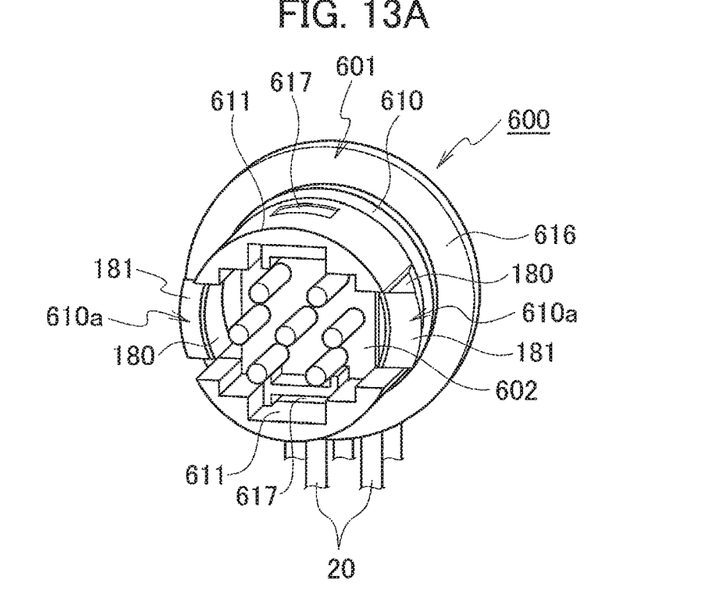
FIG. 13A is a perspective view showing the overall configuration of the waterproof component according to the other configuration example.
Figure 13B:
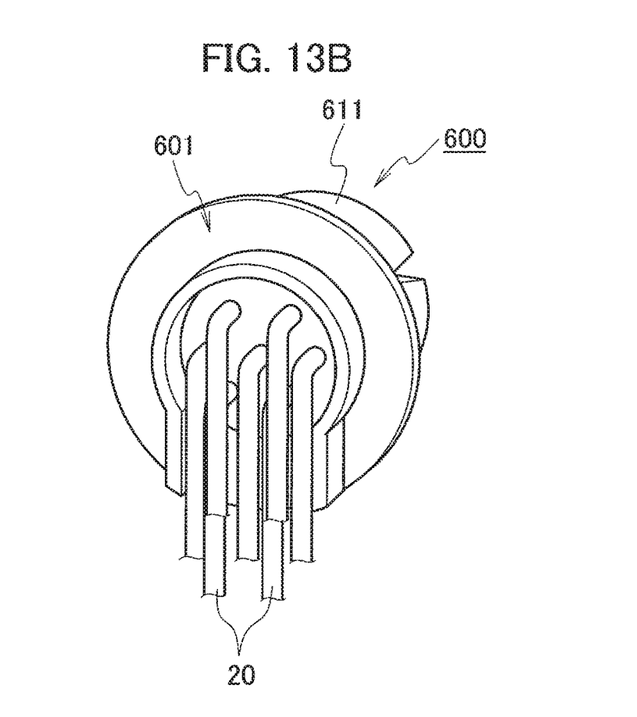
FIG. 13B is a perspective view showing the overall configuration of the waterproof component according to the other configuration example.

Here, FIG. 9 is an exploded perspective view showing a waterproof component 600 according to another configuration example, FIG. 10 is a perspective view showing a housing body 601 of the waterproof component 600 according to the other configuration example, FIG. 11 is a perspective view showing a mat seal 602 of the waterproof component 600 according to the other configuration example, FIGS. 12A and 12B are perspective views showing a mat seal cover 603 of the waterproof component 600 according to the other configuration example, and FIGS. 13A and 13B are perspective views showing the overall configuration of the waterproof component 600 according to the other configuration example.

The waterproof component 600 according to the other configuration example includes a housing body 601, a mat seal 602, and a mat seal cover 603.

The housing body 601 includes an attachment hole insertion portion 610 inserted into the attachment hole 31, an abutting portion (flange portion) 616 provided on the insertion back end side of the attachment hole insertion portion 610, a pair of left and right locking claws 610a in the figure, and a pair of upper and lower cover locking portions 611 in the figure.

The attachment hole insertion portion 610 has substantially the same outer peripheral shape as the attachment hole 31. A mat seal accommodating chamber 671 having a bottom wall 670 is formed inside the attachment hole insertion portion 610.

The abutting portion 616 has a larger diameter than the attachment hole 31. The abutting portion 616 abuts on a surface on one side of the wall portion 30 of the attachment hole 31.

The pair of locking claws 610a are disposed in positions facing each other at 180 degrees. Each locking claw 610a includes an elastic support wall 180 and a claw portion 181 provided at the tip of the elastic support wall 180. The tip of each claw portion 181 protrudes outward from the outer peripheral surface of the attachment hole insertion portion 610.

The pair of cover locking portions 611 are disposed in positions facing each other at 180 degrees. The outer peripheral surface of each cover locking portion 611 is flush with the outer peripheral surface of the attachment hole insertion portion 610. An engagement hole 617 is formed in each cover locking portion 611. The engagement hole 617 penetrates the inner peripheral surface and the outer peripheral surface of the cover locking portion 611.

A plurality of electric wire insertion holes 601a through which the electric wires 20 are inserted are formed in the bottom wall 670. In addition, the bottom wall 670 is formed with a plurality of protrusions 620 to engage with recesses for alignment 630 formed in the mat seal 602 described below.

The mat seal 602 is made of an elastically deformable material and presents a disc shape. In the mat seal 602, seven electric wire press-fitting holes 602a are formed in point symmetry positions centered on the center point. The electric wire 20 penetrates through each electric wire press-fitting hole 602a. The gap between the outer peripheral surface of each electric wire 20 and the electric wire press-fitting hole 602a of the mat seal 602 is waterproofed by compressive deformation of the mat seal 602.

Two lines of protrusions 650 are provided on the outer peripheral surface of the mat seal 602. The mat seal 602 is press-fitted into the mat seal accommodating chamber 671 with the two lines of protrusions 650 compressed and deformed.

In addition, as shown in FIG. 11 and the like, recesses for alignment 630 are formed on the front surface and the back surface of the mat seal 602. The recess for alignment 630 is formed so that the positions of the electric wire insertion hole 601a on the housing body 601 side and the electric wire press-fitting hole 602a on the mat seal 602 side match when the recess for alignment 630 is engaged with the protrusion 620 formed on the housing body 601 side.

Thus, as described above, engaging the protrusions 620 formed on the housing body 601 side with the recesses 630 allows the mat seal 602 to be easily aligned. In addition, at this time, since the positions of the electric wire insertion hole 601a on the housing body 601 side and the electric wire press-fitting hole 602a on the mat seal 602 side match, the electric wire 20 can be smoothly inserted.

It should be noted that the mat seal 602 is preferably molded so that the front side and the back side have the same shape.

Thus, since there is no need to distinguish the front and back sides of the mat seal 602, the efficiency of the work of attaching the housing body 601 to the mat seal accommodating chamber 671 can be further increased.

As shown in FIG. 9 and the like, the mat seal cover 603 is made of an elastically deformable material, and a pair of upper and lower locking protrusions 613 are provided in the figure. Each locking protrusion 613 is formed to be elastically deformable in the vertical direction.

The mat seal cover 603 is formed with insertion holes 603a through which the electric wires 20 are inserted.

As shown in FIG. 12A, on the surface facing the mat seal 602, the mat seal cover 603 is formed with protrusions 640 for engaging with the recesses for alignment 630 of the mat seal 602.

It should be noted that the protrusion 640 is formed so that the positions of the electric wire press-fitting hole 602a on the mat seal 602 side and the electric wire insertion hole 603a formed in the mat seal cover 603 match when the protrusion 640 is engaged with the recess for alignment 630 of the mat seal 602.

For this reason, only engaging the protrusion 640 with the recess 630 allows the electric wire press-fitting hole 602a on the mat seal 602 side and the electric wire insertion hole 603a on the mat seal cover 603 side to be aligned. Thus, the electric wire 20 can be smoothly inserted, and working efficiency can be improved.

In addition, due to the engagement between the protrusion 640 and the recess 630, the mat seal 602 is fixed at a predetermined position. Therefore, the mat seal 602 is prevented from being biased inside the mat seal accommodating chamber 671 irrespective of the insertion position of the electric wire 20. Thus, a situation where the sealing property (water proofing property) is lowered can be avoided.

It should be noted that the same effect can be obtained by providing protrusions for alignment on the mat seal 602 side and providing recesses that can engage with the protrusions on the housing body 601 side and the mat seal cover 603 side.

In addition, the number of the electric wires 20 is optional, and the number of the insertion holes of the mat seal 602 and the mat seal cover 603 is naturally changed in accordance with the number of the electric wires 20.

As described above, although the waterproof component of the present invention is described based on the illustrated embodiment, the present invention is not limited thereto, and the configuration of each part can be replaced with any configuration having the same function.

What is claimed is:

1. A waterproof component configured to insert an electric wire into an attachment hole penetrating a wall portion to lock, the waterproof component comprising:
 a housing body including:
  an attachment hole insertion portion configured to be inserted into the attachment hole, a mat seal accommodating chamber having a bottom wall being formed inside the attachment hole insertion portion;
  an abutting portion configured to abut a first peripheral surface of the attachment hole;
  a locking claw provided in an elastically deformable manner on an insertion tip side of the attachment hole insertion portion, the locking claw being configured to be locked to a second peripheral surface of the attachment hole opposite to the first peripheral surface; and a cover locking portion provided on an insertion tip side of the attachment hole insertion portion;

a mat seal accommodated in the mat seal accommodating chamber, the mat seal having an electric wire press-fitting hole through which an electric wire is to penetrate; and a mat seal cover locked to the cover locking portion, the mat seal cover interposing the mat seal between the mat seal cover and the bottom wall to hold the mat seal in the mat seal accommodating chamber, wherein the mat seal cover is provided with an excessive displacement prevention wall on a side where the locking claw is elastically deformed when the locking claw is inserted into the attachment hole.

* * * * *